(12) United States Patent
Kato (10) Patent No.: US 6,273,396 B1
(45) Date of Patent: Aug. 14, 2001

(54) ELECTROMAGNETIC VALVE (75) Inventor: Yasuo Kato, Niwa-gun (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/505,859

(22) Filed: Feb. 17, 2000

(30) Foreign Application Priority Data

Mar. 29, 1999 (JP) .................................................. 11-085612

(51) Int. Cl.[7] .................................................. F16K 31/06
(52) U.S. Cl. ..................... 251/129.21; 251/337; 267/180
(58) Field of Search ........................ 251/129.21, 129.22, 251/129.15, 337; 267/180

(56) References Cited

U.S. PATENT DOCUMENTS

| | | | |
|---|---|---|---|
| 1,815,612 | * | 7/1931 | Cataline et al. ....................... 251/337 |
| 2,650,617 | * | 9/1953 | Wasser ............................... 267/180 X |
| 4,077,619 | * | 3/1978 | Borlinghams ..................... 267/180 X |
| 4,144,514 | * | 3/1979 | Rinde et al. ................... 251/129.1 X |
| 4,540,154 | * | 9/1985 | Kolchinsky et al. ............ 251/129.15 |
| 4,896,860 | * | 1/1990 | Malone et al. ............... 251/129.15 X |
| 4,901,978 | * | 2/1990 | Feild ................................ 251/120 X |
| 5,211,372 | * | 5/1993 | Smith, Jr. ..................... 251/129.19 X |
| 5,548,263 | * | 8/1996 | Bulgatz et al. ............. 251/129.15 X |
| 5,626,165 | * | 5/1997 | Shinobu ...................... 251/129.15 X |
| 5,772,179 | * | 6/1998 | Morinigo et al. .............. 251/129.2 X |
| 5,813,654 | * | 9/1998 | Hopley ............................... 251/64 X |
| 5,868,167 | * | 2/1999 | Miki et al. .................. 251/129.16 X |
| 5,934,572 | * | 8/1999 | Hofmann et al. ................ 267/180 X |
| 6,047,672 | * | 4/2000 | Hanai et al. ................. 251/129.01 X |
| 6,120,003 | * | 9/2000 | Lubischer et al. .......... 251/129.15 X |
| 6,145,762 | * | 11/2000 | Orloff et al. ....................... 267/180 X |

FOREIGN PATENT DOCUMENTS

| | | |
|---|---|---|
| 08-42736 | 2/1996 | (JP) . |
| 09-119546 | 5/1997 | (JP) . |

* cited by examiner

Primary Examiner—Kevin Shaver
Assistant Examiner—John Bastianelli
(74) Attorney, Agent, or Firm—Nixon & Vanderhye PC

(57) ABSTRACT

The electromagnetic valve has a valve body capable to open and close a fluid communication path, first and second springs opposing to each other and biasing the valve body. Biasing forces of the first and second spring toward the valve body are balanced with each other so as to have valve body open the communication path. When a coil is energized, a moving member is driven so as to have the valve body move against the biasing force of the first spring during a first moving stroke so that an elastic energy may be stored in the first spring. When the coil is de-energized, the valve body is moved back by the first spring not only during the first moving stroke but also during a second moving stroke to absorb the elastic energy stored in the first spring by the second spring. There is an enough space where the moving member may move back during the second moving stroke so as not to hit any part.

16 Claims, 8 Drawing Sheets

ELECTROMAGNETIC VALVE

CROSS REFERENCE TO RELATED APPLICATION

This application is based upon and claims the benefit of priority of Japanese Patent Application No. H.11-85612 filed on Mar. 29, 1999.

BACKGROUND OF THE INVENTION

1. Field of the Invention

The present invention relates to an electromagnetic valve, in particular, applicable to a canister for processing vaporized fuel to be emitted from an automobile fuel tank.

2. Description of Related Art

Figure 4:
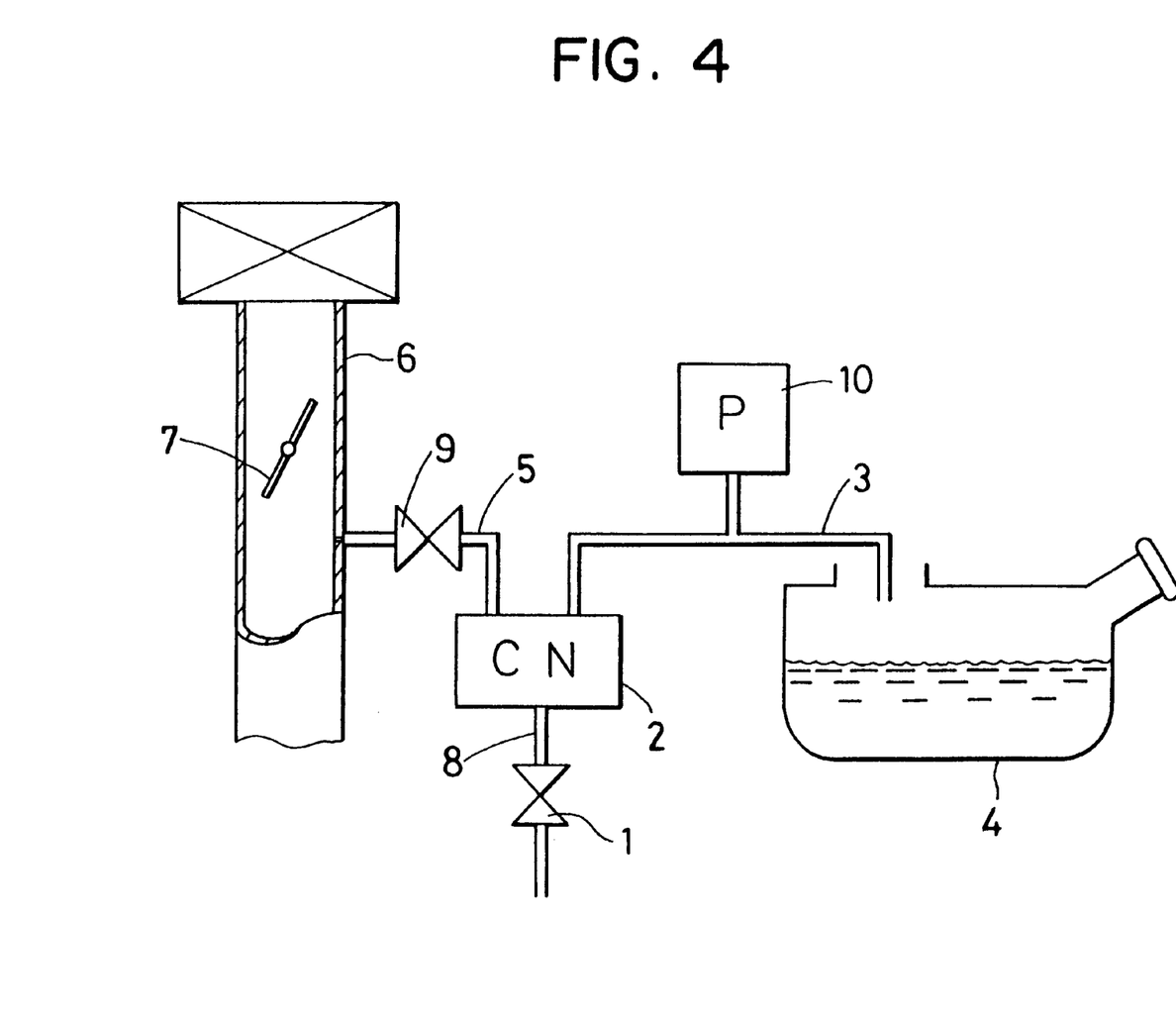
FIG. 4 is a schematic construction view of a vaporized fuel processing system.

Conventionally, a vehicle using gasoline as fuel has been provided with a vaporized fuel processing system for preventing vaporized fuel of a fuel tank from emitting into an air. This system has, as shown in FIG. 4, a canister 2 for adsorbing and holding vaporized fuel to be emitted from a fuel tank 4 and an electromagnetic valve 1 disposed at a air port 8 of the canister 2.

Figure 5:
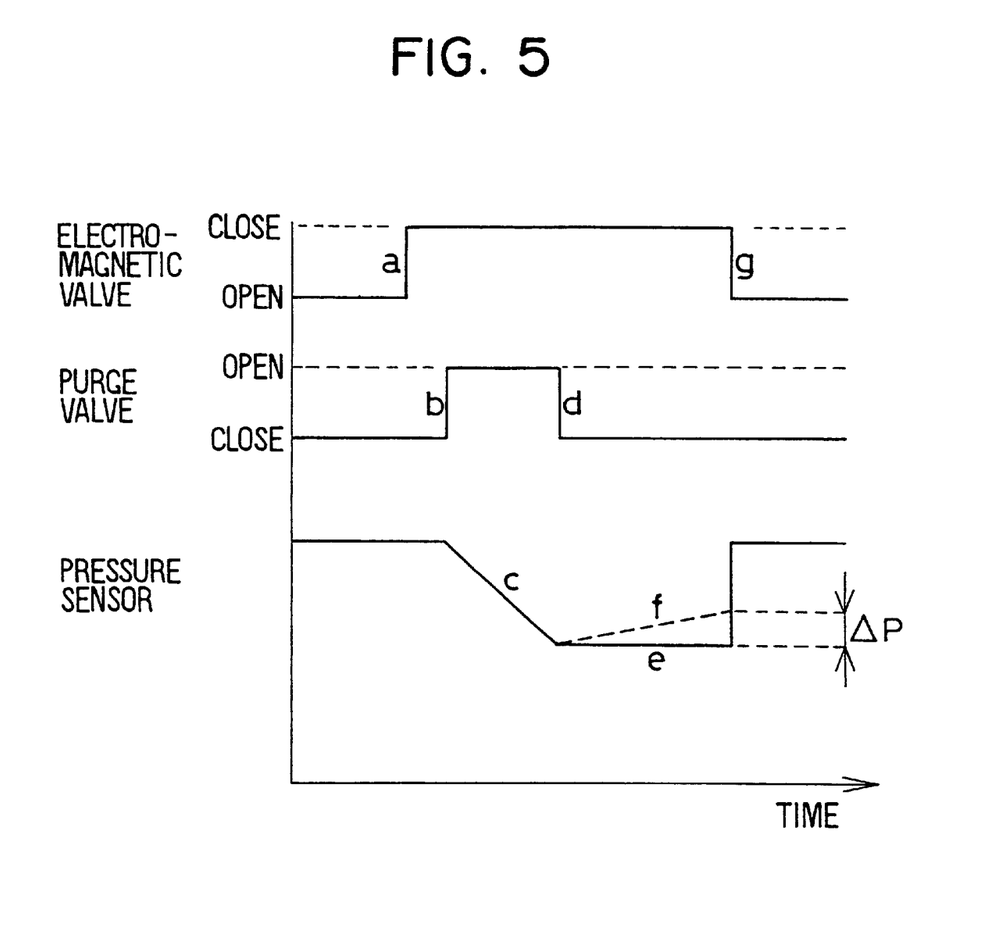
FIG. 5 is a time chart showing operations of parts at leak check.
Figure 8:
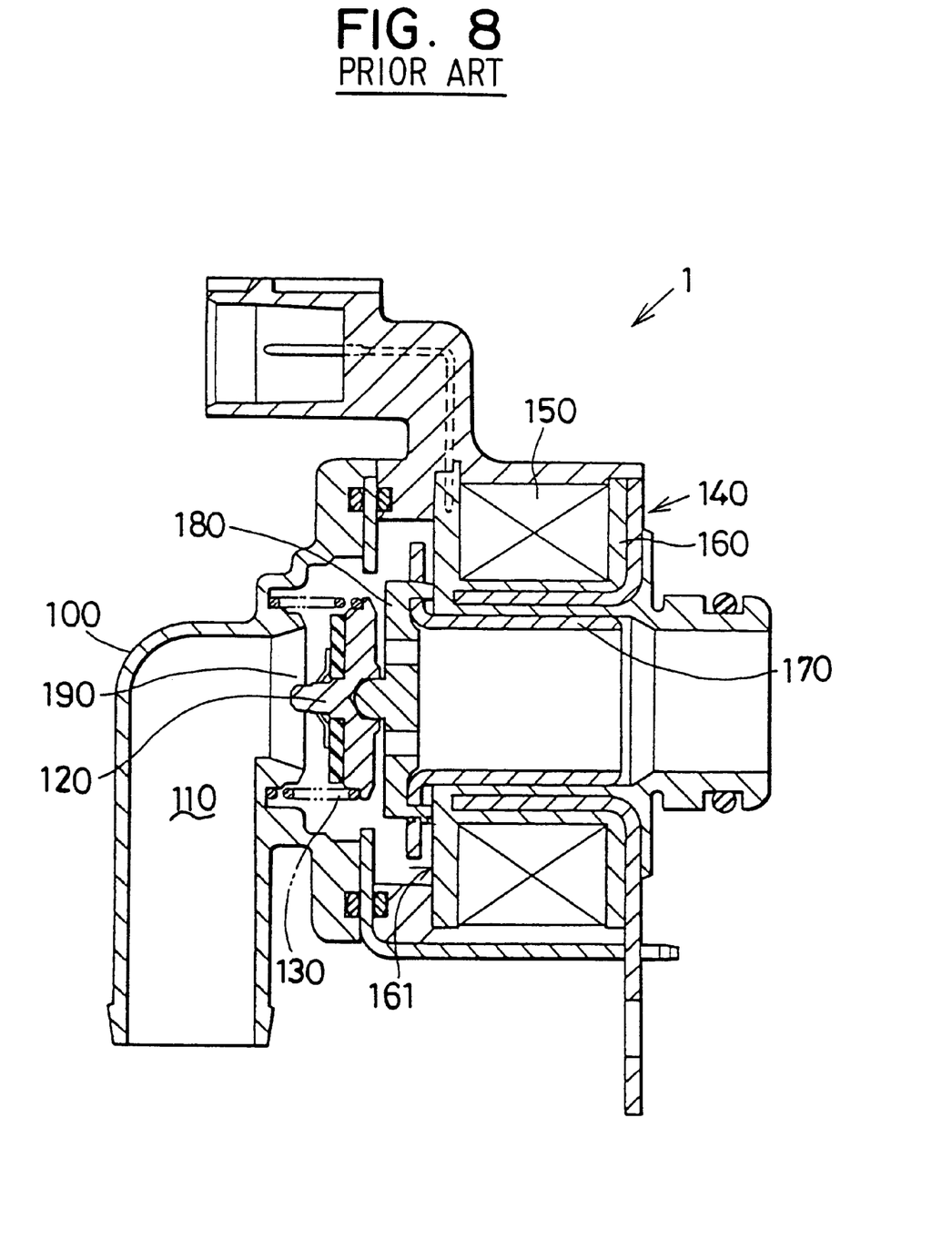
FIG. 8 is a cross sectional view of a conventional electromagnetic valve as a prior art.

The electromagnetic valve 1 carries out a predetermined valve opening and closing operation, as shown in FIG. 5, when a leak check of the system is conducted. As shown in FIG. 8, the electromagnetic valve 1 is composed of a valve body 120 for opening and closing an air communication path 110 provided in a housing 100, a spring 130 for biasing the valve body 120 in a valve opening direction (right direction in FIG. 8) and an electromagnetic device 140 for driving the valve body 120 against a biasing force of the spring 130. The electromagnetic valve 1 is normally at a valve opening state when the electromagnetic device 140 is turned off (at a state shown in FIG. 8).

The operation of the electromagnetic valve 1 at the leak check is described below. When a built-in coil 150 of the electromagnetic device 140 is energized for leak check, a moving element 170 arranged at an internal circumference of a bobbin 160 is attracted in a left direction of the drawing. Thus, the valve body 120 is pushed out in a left direction of the drawing together with a retainer 180 assembled to the moving element 170 so that a valve opening 190 of the air communication path 110 may be closed.

When the coil 150 is de-energized to finish the leak check, the valve body 120 closing the valve opening 190 is pushed back to open the valve opening 190 by the biasing force of the spring 130, since the attracting force applied to the moving element 170 is eliminated. As a result, the valve body 120 is moved back and stopped at a predetermined position where a right side end of the retainer 180 comes in contact with a left side surface 161 of the bobbin 160.

In case of the conventional electromagnetic valve, the valve body 120 is abruptly pushed back by an elastic force stored at the spring 130 to cause the end of the retainer 180 to hit the side surface of the bobbin 160 with a hammer noise.

If the leak check is conducted during a vehicle running period when the road noises are prevailing, a generation of the hammer noise does not bring a big problem because the hammer noise can be drowned out by the road noises. However, if the leak check is conducted during a vehicle stopping period when road noises are not generated, for example, at an idling period, the generation of the hammer noise might result in a big problem because a driver hears as an abnormal and annoying sound the hammer noise not drown out by the road noises.

SUMMARY OF THE INVENTION

The present invention has been made in view of the above mentioned problem, and an object of the present invention is to eliminate a hammer noise to be generated according to the opening/closing operation of the electromagnetic valve.

To achieve the above object, the electromagnetic valve for opening and closing a fluid communication path has a valve body capable to open and close the fluid communication path, a first spring for biasing the valve body in a valve opening direction and a second spring opposed to the first spring for biasing the valve body in a valve closing direction. A biasing force of the first spring toward the valve body is balanced with a biasing force of the second spring toward the valve body so that the valve body may stay or stand still at a predetermined position to open the communication path. A moving member of an electromagnetic device is driven, when a coil of the electromagnetic device is energized, so as to have the valve body move against the biasing force of the first spring during a first moving stroke extending from the predetermined position to a position where the valve body closes the fluid communication path so that an elastic energy may be stored in the first spring during the first moving stroke.

On the other hand, the valve body is moved back together with the moving member, when the coil is de-energized, by the first spring not only during the first moving stroke but also during a second moving stroke extending from the predetermined position to a position where the second spring stores an elastic energy practically responsive to the elastic energy stored in the first spring during the first moving stroke. In this case, there is an enough space where the valve body and the moving member may move back during the second moving stroke so as not to hit any part of the electromagnetic device.

According to the electromagnetic valve mentioned above, a total moving stroke of the valve body is longer by the second moving stroke than that of the conventional electromagnetic valve in which the end of the retainer hits the side surface of the bobbin so as to stop a return movement of the valve body.

It is more preferable, therefore, that the second spring has a non-linear load characteristic so that the second moving stroke may be shorter than the first moving stroke. With the construction mentioned above, the total moving stroke of the valve body becomes shorter, compared with a case that the second spring has a linear road characteristic same as that of the first spring. As a result, the electromagnetic valve may be realized not only with a more compact construction but also with a stronger electromagnetic attracting force for attracting the moving member.

Preferably, the second spring is a coil spring or a plate spring with a non-linear road characteristic so that the elastic energy stored in the first spring during the first moving stroke may be absorbed by the second spring with a less distance movement in an elastic direction.

The coil spring of the second spring may be formed in an unequal pitch shape to be coiled more finely at both end portions than a center portion, at a center portion than both end portions or at a side than the other side. Preferably, the spring is shaped symmetric in its elastic directions so that the spring may be assembled to the electromagnetic valve without care of its assembly direction.

The electromagnetic valve according to the present invention is, preferably, applied to a vehicle. Even if the coil is energized during a vehicle stopping period when road noises do not exist, the valve body may be moved to close and open the fluid communication path without a hammer noise that is annoying to a driver.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

A first embodiment of the present invention is described with reference to FIGS. 1 to 5. An electromagnetic valve 1 shown in FIG. 1 may be used in a vaporized fuel processing system for preventing vaporized fuel of a vehicle fuel tank from emitting into an air.

As shown in FIG. 4, the vaporized fuel processing system is comprised of a canister 2 in which adsorbing material such as charcoal is filled, a connecting pipe 3 connecting the canister 2 and a fuel tank 4, and a purge pipe 5 connecting the canister 2 and an intake manifold 6 of a vehicle engine at a vicinity of a throttle valve 7. The canister 2 is provided with an air port 8 from which the atmosphere is introduced. The electromagnetic valve 1 according to the present invention is disposed at the air port 8. The electromagnetic valve 1 is normally at a valve opening state (normally open state), except a time when a leak check as described in detail later is conducted, so that the air port 8 may normally open to the atmosphere.

Vaporized fuel of the fuel tank 4 is transmitted through the connecting pipe 3 to the canister 2 and, first of all, is adsorbed and held in the adsorbing material. Then, the adsorbed fuel is detached from the adsorbing material and transmitted to the intake manifold 6 through the purge pipe 5 by the atmospheric air introduced from the air port 8 to the canister 2 as the intake manifold 6 becomes a negative pressure during an engine operation.

A purge valve 9 is disposed at the purge pipe 5. The purge valve 9 is operative to adjust an amount of vaporized fuel to be transmitted from the canister 2 to the intake manifold 6 according to a duty control by ECU (Electronic Control Unit) based on engine operating conditions.

With reference to FIG. 5, a method of the leak check is described hereinafter. The leak check is conducted according to a following sequential order to detect an air leakage in the vaporized fuel processing system.

At first, the electromagnetic valve 1 is closed as shown in a letter a, resulting in closing the air port 8. Next, the purge valve 9 is opened as shown in a letter b so that the negative pressure in the intake manifold 6 may be introduced into the system. As a result, the pressure in the system decreases to a predetermined value during the period when the purge valve is open, as shown in a letter c.

Then, after the purge valve 9 is closed as shown in a letter d, the pressure in the system, which is detected, for example, by a pressure sensor 10 disposed in the connecting pipe 3, keeps the predetermined value as shown in a letter e, unless there is an air leakage in the system. However, if the air leakage exists in the system, the pressure in the system can not keep a stable state as shown in a letter f and is changed by a deviation ΔP, which may be detected by the pressure sensor 10 for judging the air leakage.

Finally, the electromagnetic valve 1 is returned to open so that the air port 8 may be opened as shown in a letter g to finish the leak check.

Next, the construction of the electromagnetic valve 1 is described with reference to FIG. 1. The electromagnetic valve 1 is composed of a housing 11, a valve body 12, a first spring 13, a second spring 14 and an electromagnetic device described in detail later. The housing 11 is provided with an air communication path 15, an end opening 15a of which is open to the atmosphere and an another end opening 15b of which is connected to the air port 8 of the canister 2. The air communication path 15 is further provided on a way thereof with a valve opening 16 that is opened and closed by the movement of the valve body 12.

The valve body 12 is comprised of, for example, a resin valve element 12a and a rubber valve plate 12b attached to the valve element 12a. The valve plate 12b is arranged to face the valve opening 16.

An end of the first spring 13 is retained in a recess portion at an inner wall of the housing 11 around the valve opening 16. The other end of the first spring 13 is retained to an outside periphery of the valve element 12a. The first spring 13 biases the valve body 12 in a valve opening direction (in a right direction in FIG. 1). The first spring 13 has a linear road characteristic as shown by a dotted line a in FIG. 2.

The electromagnetic device is composed of a coil 17 and magnetic circuit formation elements 18 and 19 and a moving core 20. The coil 17, which is coiled on a bobbin 21 formed integrally with the housing 11 and is connected to a terminal 23 formed in a connector 22, is energized by a current controlled by ECU.

The magnetic circuit formation elements 18, 19 are a first plate 18 and a second plate 19, both of which are made of magnetic material such as iron and constitute a part of magnetic circuit.

The moving core 20 is made of magnetic material such as iron and is composed of a cylindrical portion 20a to be slidably moved along a cylindrical inner circumferential surface of the bobbin 21, which constitutes a part of the air communication path 15, and a flange portion 20b radially extending from an end of the cylindrical portion 20a. A retainer 24 is attached to the flange portion 20b for holding the valve body 12. For the purpose of the present invention, the connector 22, coil 17, first and second plates 18 and 19 and the bobbin 21 are collectively or respectively referred as a fixing member of the electromagnetic device and the moving core 20 and the retainer 24 are collectively or respectively referred as a moving member of the electromagnetic device.

Figure 1:
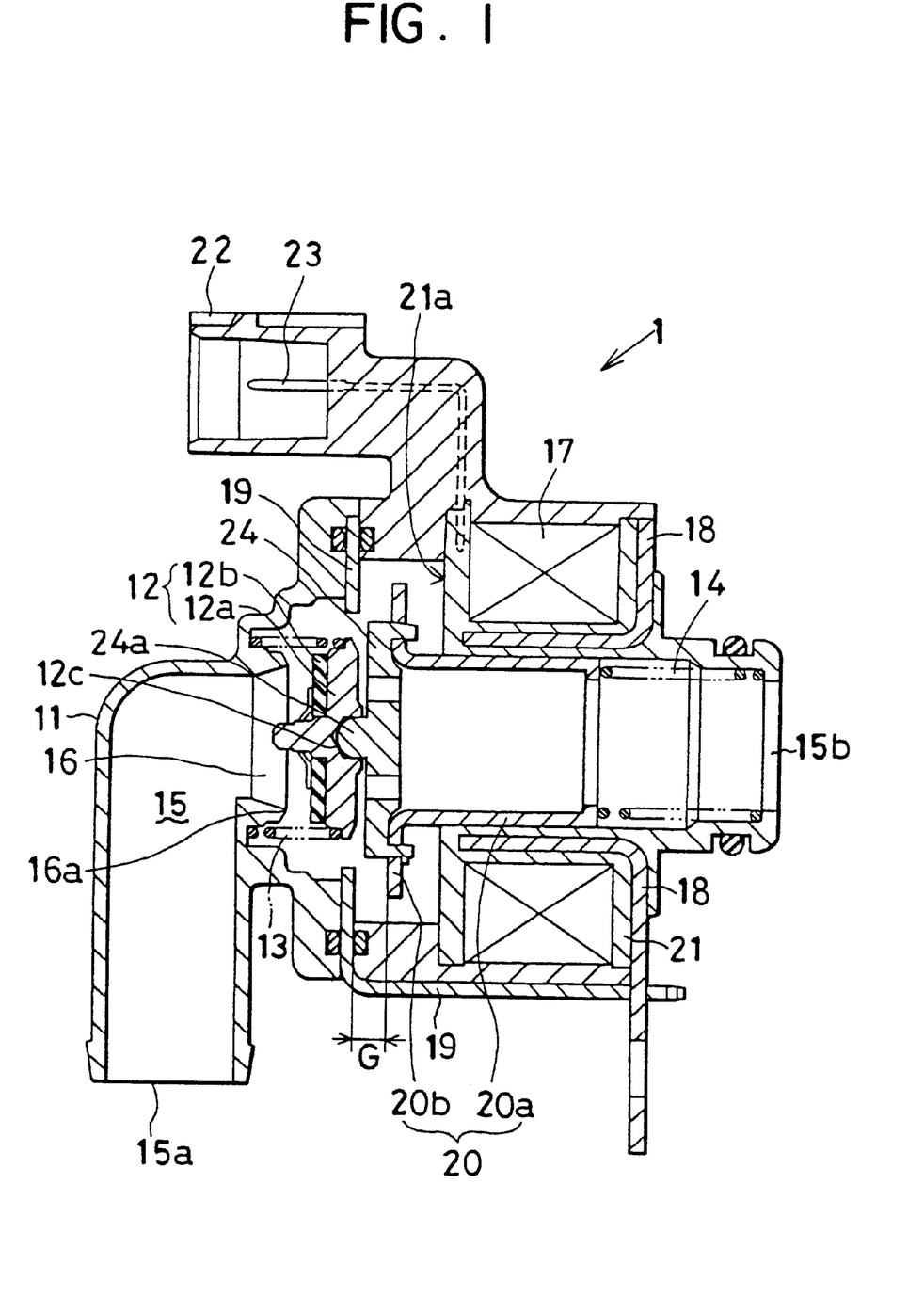
FIG. 1 is a cross sectional view of an electromagnetic valve according to a first embodiment of the present invention.

According to the electromagnetic device mentioned above, when the coil 17 is energized, the moving core 20 is attracted toward a left side in FIG. 1 by an electromagnetic attracting force generated between the flange portion 20b and the second plate 19 facing to the flange portion 20b via an air gap G. As a result, the valve body 12 is pushed out to come in contact with a circumferential edge (valve seat 16a) of the valve opening 16 against the biasing force of the first spring 13. When the coil 17 is de-energized, the electromagnetic attracting force is distinguished so that the moving core 20 is moved back together with the valve body 12 by the biasing force of the first spring 13.

The valve body 12 is provided at a center of the valve element 12a with a recess portion 12c to which a projecting portion 24a provided at a center of the retainer 24 is fitted. An inner surface of the recess portion 12c of the valve element 12a is formed in a conical shape and a leading end outer surface of the projecting portion 24a of the retainer 24 is formed in a hemispherical shape. Therefore, at a state that the projecting portion 24a is fitted to the recess portion 12c, the valve body 12 may be inclined relative to the retainer 24 within a predetermined angle range all around a circumference of the retainer 24.

The second spring 14, an end of which is retained to an end surface of the cylindrical portion 20a of the moving core 20 and an another end of which is retained to an inside step portion of the another end opening 15b of the air communication path 15, biases the valve body 12 in a valve closing direction (in a left direction in FIG. 1) via the moving core 20 and the retainer 24. Therefore, the valve body 12 stays so as to open the valve opening 16 at a predetermined position (position shown in FIG. 1) where the biasing force of the first spring 13 is balanced with the biasing force of the second spring 14.

Figure 2:
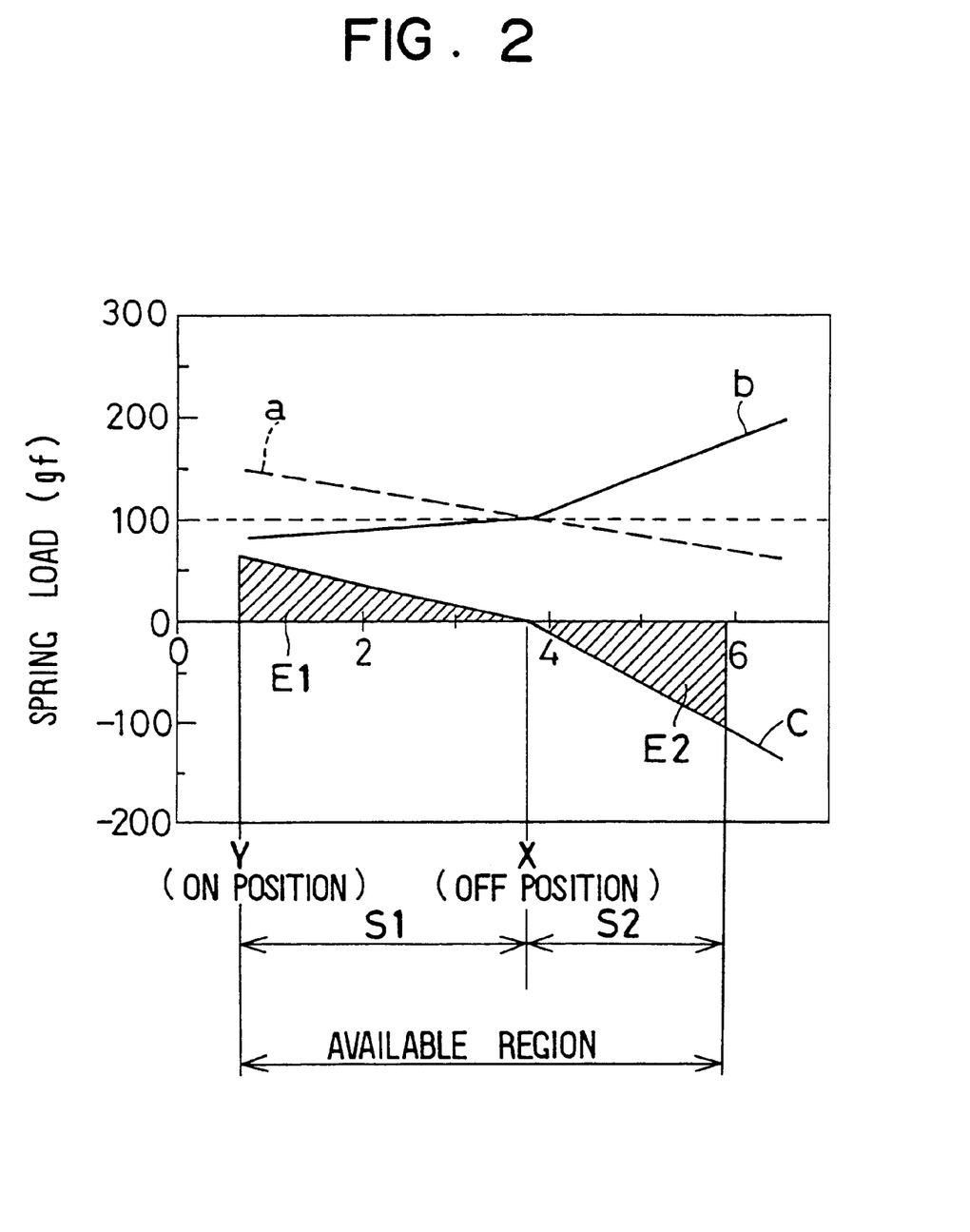
FIG. 2 is a chart showing a load characteristic of a spring according to a first embodiment of the present invention.
Figure 3A:
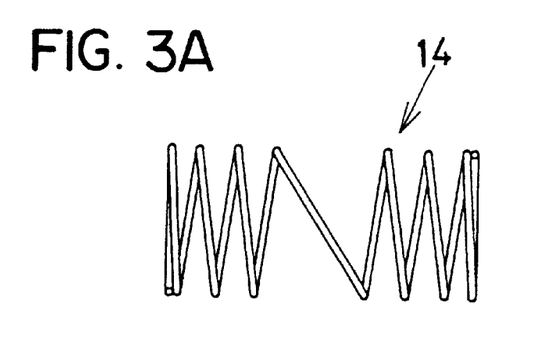
FIG. 3A is a perspective view of a second spring.
Figure 3B:
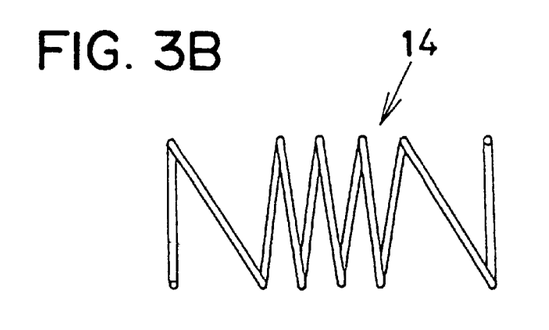
FIG. 3B is a perspective view of an alternate of the second spring.
Figure 3C:
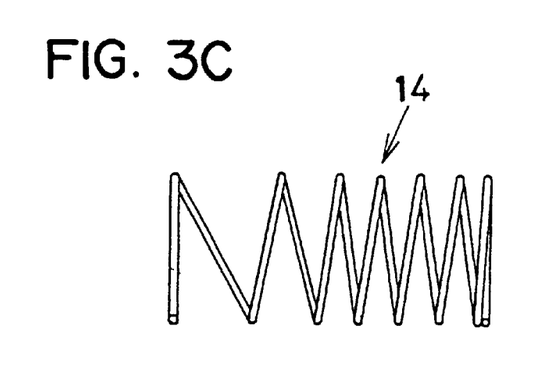
FIG. 3C is a perspective view of an another alternate of the second spring.

The second spring 14 is formed with an unequal pitch in elastic directions (in left and right directions in FIG. 3), for example, in such a manner that the spring 14 is coiled finely at opposite ends and roughly at a center as shown in FIG. 3A, roughly at opposite ends and finely at a center as shown in FIG. 3B or roughly at a side and finely at the other side as shown in FIG. 3C. As a result, the second spring 14 has a non-linear load characteristic as shown by a solid line b in FIG. 2. Therefore, a combined load characteristic of the first and second springs 13 and 14 is as shown by a solid line c in FIG. 2. The valve body 12 can stand still at a point X where a load to the first spring 13 is balanced with a load to the second spring 14.

Next, an operation of the electromagnetic valve 1 is described hereinafter. On energizing the coil 17 of the electromagnetic device to start the leak check, the moving core 20 arranged at the inner circumference of the bobbin 21 is attracted to move in a left direction in FIG. 1. Thus, the valve body 12 is pushed out in a left direction in FIG. 1 together with the retainer 24 attached to the moving core 20 so that the valve plate 12b of the valve body 12 may come in contact with the valve seat 16a to close the valve opening 16.

After finishing the leak check, when the coil 17 is de-energized, the electromagnetic force applied to the moving core 20 is eliminated. Therefore, by the biasing force of the first spring 13, the valve body 12 is pushed back to have the valve plate 12b apart from the valve seat 16a so that the valve opening 16 may be opened. In this case, the valve body 12 can not be accurately stopped at once at the predetermined position (X point in FIG. 2) and passes through the predetermined position for the present (overshoot). The valve body 12, once overshooted, is returned back toward the predetermined position again and, after repeating an attenuated back and forth movement over the predetermined position, is finally stopped at the predetermined position.

According to the embodiment of the present invention, as the second spring 14 has the non-linear load characteristic, the combined load characteristic of the first and second springs 13 and 14 may be realized as shown by the solid line c in FIG. 2. With respect to the combined load characteristic, the load characteristic at a valve closing direction side of the predetermined position X where the valve body 12 is finally stopped (left side of the point X in FIG.2) differs from that at a overshooting side of the predetermined position X (right side of the point X in FIG. 2) and a line showing the load characteristic at the overshooting side is more steeply inclined than that at the valve closing direction side. Therefore, a second moving stroke S2 during which the valve body 12 overshoots beyond the point X in FIG. 2 becomes shorter than a first moving stroke S1 during which the valve body 12 moves from the point X in FIG. 2 to a point Y in FIG. 2 where the valve body 12 closes the valve opening 16.

To determine the first moving stroke S1 and the second moving stroke S2 shorter than the first moving stroke S1, it may define the combined load characteristic in such a manner that an elastic energy E1 stored in the first spring 13 during the first moving stroke S1 that the valve body 12 moves is nearly same as an elastic energy stored in the second spring 14 during the second moving stroke S2 that the valve body 12 moves. At a state that the valve body 12 stands still at the predetermined position X (at a state shown in FIG. 1), a distance between an end of the retainer 24 attached to the flange portion 20b of the moving core 20 and a left side end surface of the bobbin 21 is longer than the second moving stroke S2 so that the retainer 24 may not hit the side surface of the bobbin 21 even if the valve body 12 overshoots beyond the point X shown in FIG. 2.

In the electromagnetic valve 1 according to the embodiment mentioned above, the valve body 12 is biased by the first and second springs 13 and 14 so as to oppose the first spring 13 to the second spring 14 and stays to open the valve opening 16 at the predetermined position where the biasing forces of the first and second springs 13 and 14 are balanced with each other.

Therefore, it is not necessary to stop the movement of he retainer 24, the moving core 20 or the valve body 12 in manner that the end of the retainer 24 comes in contact with the left side end surface 21a of the bobbin 21 as is in the conventional electromagnetic valve. Thus, the generation of the hammer noise may be prevented when the opening and closing operation of the valve body 12 is conducted for the leak check, if there is an enough space between the moving member of the electromagnetic device or the valve body 12 and the fixed member of the electromagnetic device to an extent that the moving member or the valve body 12 does not hit the fixing member even if the valve body 12 moves the second moving stroke S2.

Figure 6:
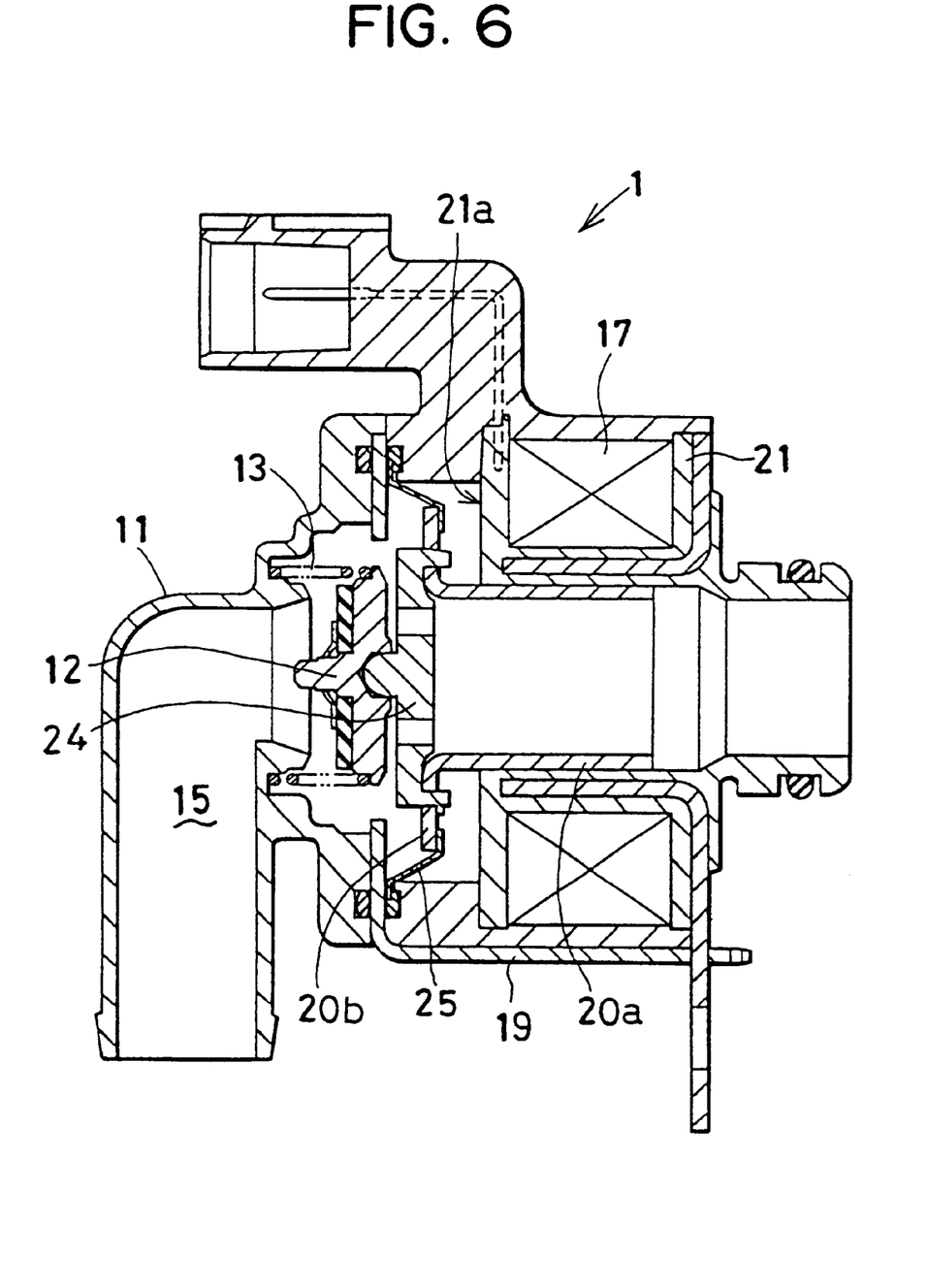
FIG. 6 is a cross sectional view of an electromagnetic valve according to a second embodiment of the present invention.

An electromagnetic valve 1 according to a second embodiment of the present invention is described with reference to FIGS. 6 and 7. The electromagnetic valve 1 has a plate spring 25 as a second spring for biasing the valve body 12. The plate spring 25 is formed in a ring shape and an outside periphery thereof is rigidly held between the housing 11 and the second plate 19 and an inside periphery thereof is fixed to the flange portion 20b of the moving core 20 so as to bias the valve plate 12 in a valve opening direction (in a left direction in FIG. 6).

Figure 7:
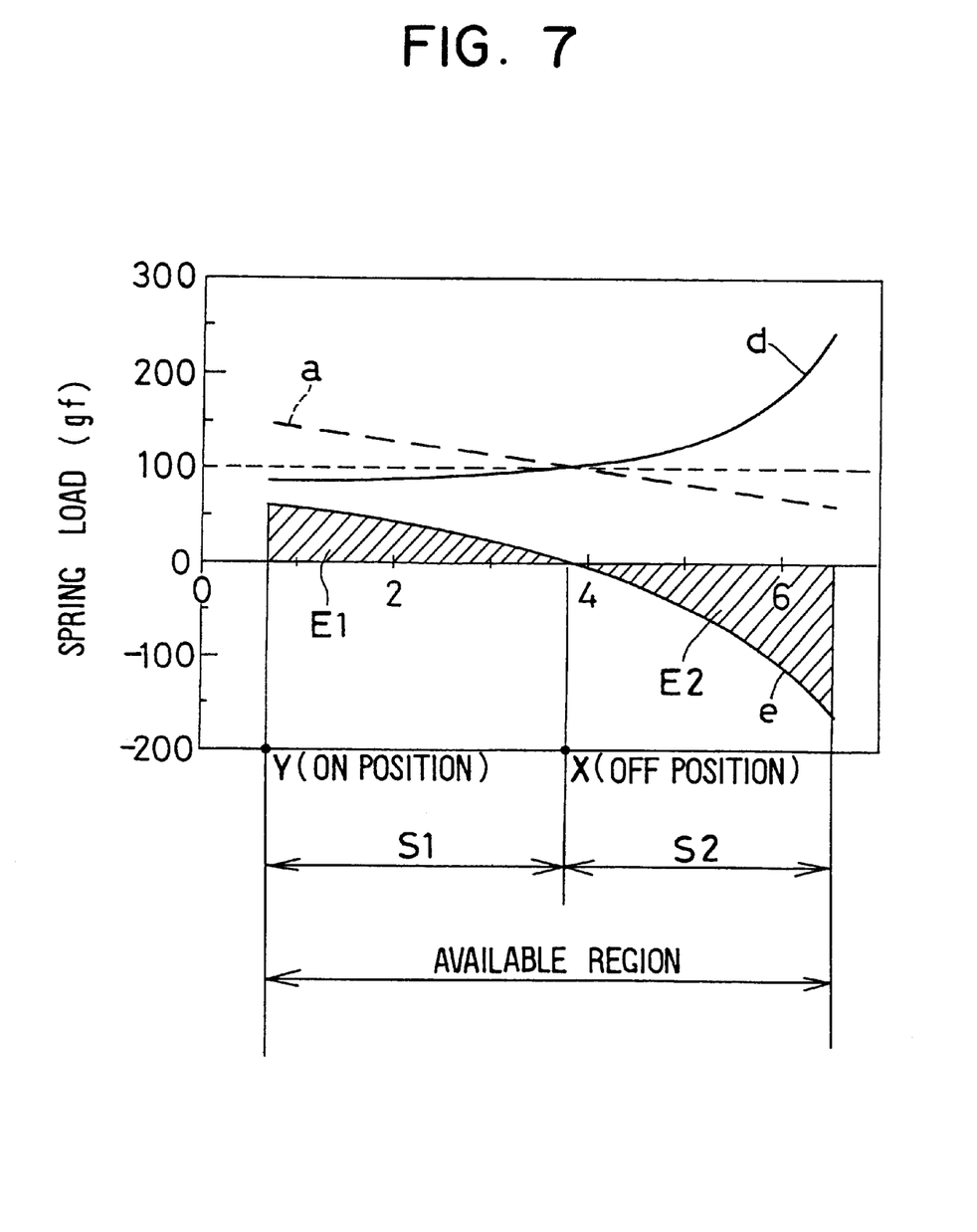
FIG. 7 is a chart showing a load characteristic of a spring according to a second embodiment of the present invention.

The plate spring 25 has a non-linear load characteristic as shown by a solid line d in FIG. 7 so that a combined load characteristic of the first spring 13 and the plate spring 25 may be as shown by a solid line e in FIG. 7.

With respect to the combined load characteristic, the load characteristic at a valve closing direction side of the redetermined position X where the valve body 12 is finally stopped (left side of the point X in FIG.7) differs from that at a overshooting side of the predetermined position X (right side of the point X in FIG. 7) and a line showing the load characteristic at the overshooting side is more steeply inclined than that at the valve closing direction side. Therefore, a second moving stroke S2 during which the valve body 12 overshoots beyond the point X in FIG. 7 becomes shorter than a first moving stroke S1 during which the valve body 12 moves from the point X in FIG. 7 to a point Y in FIG. 7 where the valve body 12 closes the valve opening 16.

To determine the first moving stroke S1 and the second moving stroke S2 shorter than the first moving stroke S1, it may define the combined load characteristic in such a manner that an elastic energy E1 stored in the first spring 13 during the first moving stroke S1 moves is nearly same as an elastic energy stored in the plate spring 25 during the second moving stroke S2. At a state that the valve body 12 stands still at the predetermined position X, a distance between an end of the retainer 24 and a left side end surface 21a of the bobbin 21 is longer than the second moving stroke S2 so that the retainer 24 may not hit the side surface of the bobbin 21 even if the valve body 12 overshoots beyond the point X.

In place of the coil spring or the plate spring as the first or second spring 13 or 14 according to the first or second embodiment mentioned above, any kind of a first or second biasing member can be employed. The second biasing member may be, for example, a combination body composing of a coil spring and a plate type elastic element, as far as the combination body has a non-linear load characteristic as shown in FIG. 2 or in FIG. 7.

Further, as mentioned above, the electromagnetic valve 1 according to the first or second embodiment is provided with the second spring 14 having the non-linear load characteristic for the purpose of realizing a more compact electromagnetic valve with a stronger electromagnetic attracting force for attracting the moving member of the electromagnetic device, since the elastic energy stored in the first spring 13 during the first moving stroke may be absorbed by the second spring 14 with a less distance movement in the elastic direction.

However, for the purpose of eliminating the hammer noise, it is not always necessary to employ the second spring 14 having the non-linear load characteristic. But, a second spring having a linear load characteristic same as the first spring 13 may be employed, as far as the biasing forces of the first and second springs are balanced with each other so as to have the valve body 12 open the valve opening 16 and there is a space between the moving and fixed members of the electromagnetic device so that the moving member may not hit any part of the fixed member when the valve body 12 moves back during the second moving stroke.

Furthermore, the electromagnetic valve 1 according to he preferred embodiment is applicable not only to the vaporized fuel processing system for vehicles as mentioned above, but also to any vehicle apparatus or systems such as an auxiliary device or an air-conditioning system for vehicles. When the electromagnetic device is energized/de-energized during a vehicle stopping period for the valve opening/closing operation, the same advantage or effect as mentioned above may be obtained.

What is claimed is:

1. An electromagnetic valve for opening and closing a fluid communication path comprising:

a valve body capable to open and close the fluid communication path;

a first biasing member for biasing the valve body in a valve opening direction;

a second biasing member for biasing the valve body in a valve closing direction, a biasing force of the first biasing member to the valve body being balanced with a biasing force of the second biasing member to the valve body in the absence of a force opposing said biasing forces so that the valve body may stay at a predetermined intermediate position to open the communication path; and an electromagnetic device having a fixed member for generating an electromagnetic attracting force when energized and a moving member movable according to the electromagnetic attracting force, the moving member being driven, when the fixed member is energized, so as to have the valve body move against the biasing force of the first biasing member during a first moving stroke extending from the predetermined position to a position where the valve body closes the fluid communication path so that an elastic energy may be stored in the first biasing member during the first moving stroke, wherein the valve body is moved back together with the moving member, when the fixed member is de-energized, by the first biasing member not only during the first moving stroke but also during a second moving stroke extending from the predetermined position to a position where the second biasing member stores an elastic energy practically responsive to the elastic energy stored in the first biasing member during the first moving stroke and, further, wherein there is enough space where the valve body and the moving member may move during the first and second moving stroke so as not to hit the fixed member.

2. An electromagnetic valve according to claim 1, wherein the second biasing member has a non-linear load characteristic so that the second biasing member has a spring stiffness stronger during the second moving stroke than during the first moving stroke, thereby to make the second moving stroke shorter than the first moving stroke.

3. An electromagnetic valve according to claim 2, wherein the second biasing member is a coil spring.

4. An electromagnetic valve according to claim 3, wherein the coil spring is formed in a coil shape with an unequal pitch to be finely coiled at opposite end portions thereof and roughly coiled at a center portion thereof.

5. An electromagnetic valve according to claim 3, wherein the coil spring is formed in a coil shape with an unequal pitch to be finely coiled at a center portion thereof and roughly coiled at opposite end portions thereof.

6. An electromagnetic valve according to claim 3, wherein the coil spring is formed in a coil shape with an unequal pitch to be finely coiled at a side thereof and roughly coiled at another side thereof.

7. An electromagnetic valve according to claim 2, wherein the second biasing member is a plate spring.

8. An electromagnetic valve according to claim 1, the electromagnetic valve being applied to a vehicle, wherein the fixed member is energized at least during stopping of the vehicle so that the valve body may be moved to close and open the fluid communication path.

9. An electromagnetic valve for opening and closing a fluid flow path, comprising;

a valve body mounted for movement to selectively open and close the fluid flow path;

a first spring member operatively coupled to said valve body to bias the valve body in a valve opening direction;

a second spring member operatively coupled to the valve body to bias the valve body in a valve closing direction, a biasing force of said first spring member being balanced with a biasing force of the second spring member in the absence of a force opposing said biasing forces to define a valve body rest position which is an intermediate position in which the fluid flow path is open; and     an electromagnetic device having a fixed member for generating an electromagnetic attracting force when energized and a moving member movable according to the electromagnetic attracting force and operatively coupled to said valve body, the moving member being driven, when the fixed member is energized, so as to move the valve body against the biasing force of the first spring member along a first moving stroke from said rest position to a position where the valve body closes the fluid flow path, so that a first elastic energy is stored in the first spring member during the first moving stroke and, when the fixed member is de-energized, the first spring member moves the valve body and the moving member back along the first moving stroke and also along a second moving stroke extending from said rest position to a position where the second spring member stores a second elastic energy related to said first elastic energy and, further,     wherein the valve body and the moving member are disposed to move along the first moving stroke and the second moving stroke so as not to hit the fixed member.

10. An electromagnetic valve according to claim 9, wherein the first spring member is a coil spring.

11. An electromagnetic valve according to claim 9, wherein the second spring member is a plate spring.

12. An electromagnetic valve according to claim 9, wherein the second spring member is a coil spring.

13. An electromagnetic valve according to claim 12, wherein the coil spring is formed in a coil shape with an unequal pitch to be finely coiled at opposite end portions thereof and roughly coiled at a center portion thereof.

14. An electromagnetic valve according to claim 12, wherein the coil spring is formed in a coil shape with an unequal pitch to be finely coiled at a center portion thereof and roughly coiled at opposite end portions thereof.

15. An electromagnetic valve according to claim 12, wherein the coil spring is formed in a coil shape with an unequal pitch to be finely coiled at a side thereof and roughly coiled at another side thereof.

16. An electromagnetic valve according to claim 9, wherein the electromagnetic valve is applied to a vehicle, wherein the fixed member is selectively energized at least during stopping of the vehicle so that the valve body may be moved to close and open the fluid communication path.

\* \* \* \* \*